US012748328B2

(12) United States Patent
Hsieh et al.

(10) Patent No.: US 12,748,328 B2
(45) Date of Patent: Sep. 29, 2026

(54) DISPLAY DEVICE

(71) Applicant: AUO Corporation, Hsinchu City (TW)

(72) Inventors: Shang-Wei Hsieh, Hsinchu City (TW); Jia-Hong Wang, Hsinchu City (TW); Wang-Shuo Kao, Hsinchu City (TW); Ya-Ling Hsu, Hsinchu City (TW); Chen-Hsien Liao, Hsinchu City (TW)

(73) Assignee: AUO Corporation, Hsinchu City (TW)

( * ) Notice: Subject to any disclaimer, the term of this patent is extended or adjusted under 35 U.S.C. 154(b) by 167 days.

(21) Appl. No.: 18/934,234

(22) Filed: Nov. 1, 2024

(65) Prior Publication Data

US 2025/0298268 A1 Sep. 25, 2025

(30) Foreign Application Priority Data

Mar. 25, 2024 (TW) .................................. 113111082

(51) Int. Cl.
*G02F 1/1333* (2006.01)
*G02F 1/13357* (2006.01)

(52) U.S. Cl.
CPC .... *G02F 1/133388* (2021.01); *G02F 1/13336* (2013.01); *G02F 1/1336* (2013.01)

(58) Field of Classification Search
CPC ........... G02F 1/133388; G02F 1/13336; G02F 1/1336; G02F 1/133603; G02F 1/133606; G02F 1/134345; G02F 1/16753; H10K 59/18; G06F 1/1647; G06F 1/1652
See application file for complete search history.

(56) References Cited

U.S. PATENT DOCUMENTS

| | | | |
|---|---|---|---|
| 7,655,486 B2 | 2/2010 | Thompson et al. | |
| 9,308,680 B2 | 4/2016 | Thompson et al. | |
| 11,316,083 B2 | 4/2022 | Lin et al. | |
| 2021/0408346 A1 | 12/2021 | Lin et al. | |
| 2024/0036374 A1 | 2/2024 | Xiao et al. | |
| 2024/0353709 A1* | 10/2024 | Fu | G02F 1/133331 |

FOREIGN PATENT DOCUMENTS

| | | | |
|---|---|---|---|
| CN | 105044964 | 11/2015 | |
| CN | 106229401 | 12/2016 | |
| CN | 110473950 | 11/2019 | |
| CN | 110632789 A * | 12/2019 | G09F 9/33 |
| CN | 212460249 | 2/2021 | |
| CN | 113990209 | 1/2022 | |

(Continued)

*Primary Examiner* — Anne M Hines
*Assistant Examiner* — Jose M Diaz
(74) *Attorney, Agent, or Firm* — JCIPRNET

(57) ABSTRACT

A display device includes a display unit. The display unit includes a substrate with a liquid crystal display area and a peripheral display area surrounding the liquid crystal display area, where the liquid crystal display area includes a plurality of first sub-pixels and the peripheral display area includes a plurality of second sub-pixels. The second sub-pixel includes a light-emitting element, an encapsulation layer, and a diffusion layer. The encapsulation layer surrounds and contacts the light-emitting element, and the diffusion layer surrounds and contacts the encapsulation layer. A projected area of the diffusion layer on the substrate is substantially equal to a projected area of the first sub-pixel on the substrate.

10 Claims, 7 Drawing Sheets

(56) References Cited

FOREIGN PATENT DOCUMENTS

| | | | | |
|---|---|---|---|---|
| CN | 114815342 | | 7/2022 | |
| CN | 114822286 A | * | 7/2022 | ............... G09F 9/33 |
| CN | 114973985 | | 8/2022 | |
| TW | I454505 | | 10/2014 | |
| TW | I539621 | | 6/2016 | |

* cited by examiner

DISPLAY DEVICE

CROSS-REFERENCE TO RELATED APPLICATION

This application claims the priority benefit of Taiwan application serial no. 113111082, filed on Mar. 25, 2024. The entirety of the above-mentioned patent application is hereby incorporated by reference herein and made a part of this specification.

BACKGROUND

Technical Field

The disclosure relates to an electronic device, and particularly relates to a display device.

Description of Related Art

With the continuous innovation of display technology, displays with large display area ratio, narrow borders or even borderless displays have gradually become the mainstream of the market. When applied to spliced display technologies, reducing the proportion of the border (or peripheral area) to the display area may prevent the splicing area from being noticed by the user when viewing the display, thereby improving the quality of the display image. However, how to effectively reduce the border size or improve the above-mentioned spliced display problem is still a problem that relevant manufacturers are working hard to solve.

SUMMARY

The disclosure provides a display device such that a border area or peripheral area of a display does not affect the user's viewing experience.

A display device of the disclosure includes a display unit. The display unit includes a substrate with a liquid crystal display area and a peripheral display area surrounding the liquid crystal display area, where the liquid crystal display area includes a plurality of first sub-pixels and the peripheral display area includes a plurality of second sub-pixels. The second sub-pixel includes a light-emitting element, an encapsulation layer, and a diffusion layer. The encapsulation layer surrounds and contacts the light-emitting element, and the diffusion layer surrounds and contacts the encapsulation layer. A projected area of the diffusion layer on the substrate is substantially equal to a projected area of the first sub-pixel on the substrate.

Based on the above, in the display device of the disclosure, the light-emitting element is disposed in the peripheral display area to provide display functions, so that both the liquid crystal display area and the peripheral display area may provide display images, and the entire display surface of the display may be theoretically borderless, so as to provide a good viewing experience when used as a spliced display device. Not only that, since the projected area of the diffusion layer on the light-emitting element in the border area is substantially equal to the projected area of the sub-pixel in the liquid crystal display area, the light field of the pixels in the peripheral display area and the light field of the pixels in the liquid crystal display area may be made nearly consistent. It makes it difficult for users to detect the difference between the two, and theoretically achieves the effect of a full-screen display device, greatly improving the quality of the display image.

In order to make the above-mentioned features and advantages of the disclosure clearer and easier to understand, the following embodiments are given and described in details with accompanying drawings as follows.

DESCRIPTION OF THE EMBODIMENTS

Figure 1:
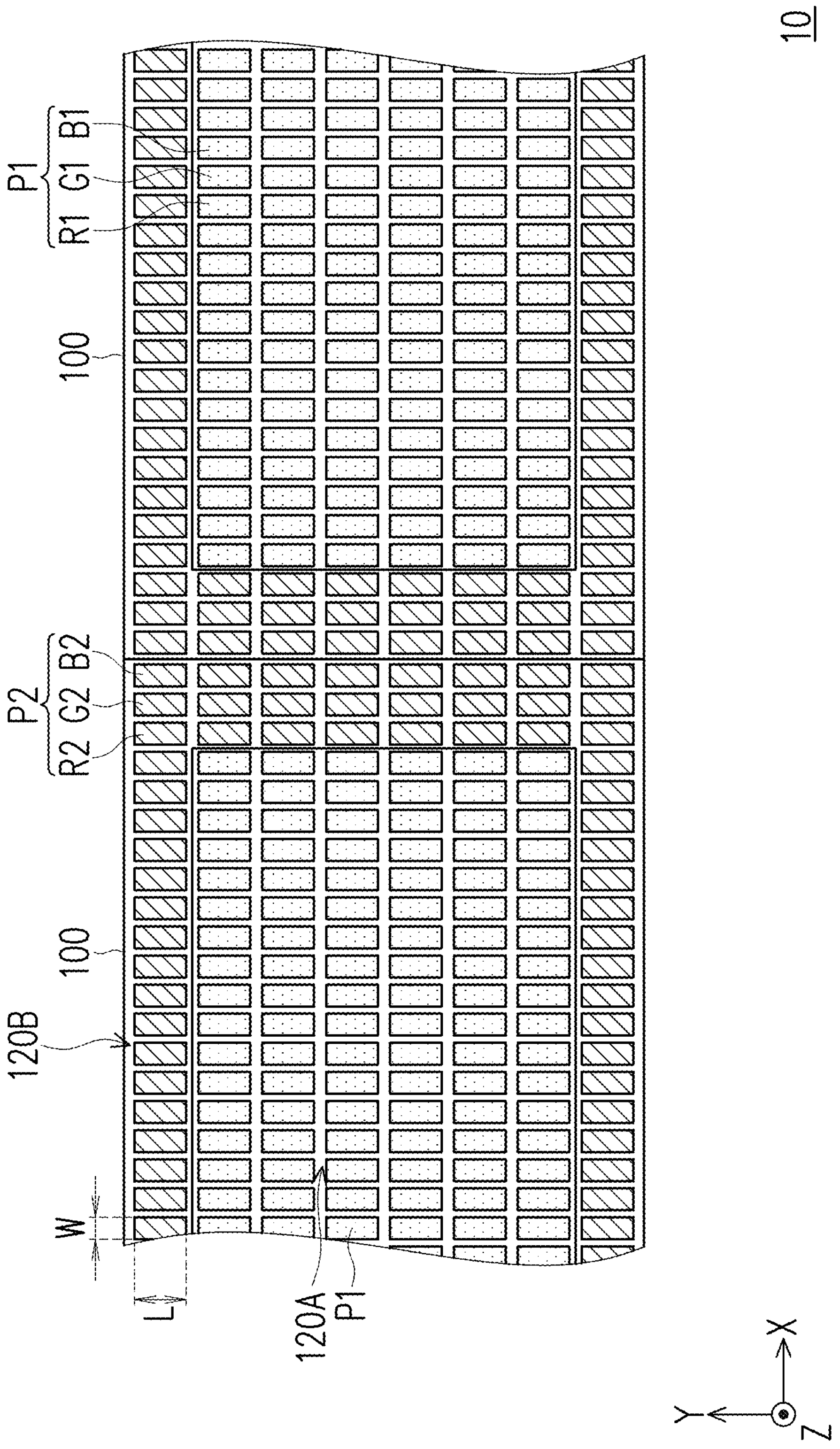
FIG. 1 is a schematic top view of a display device according to an embodiment of the disclosure.

The term "about," "approximately," "essentially," or "substantially" as used herein is inclusive of the stated value and means within an acceptable range of deviation for the particular value as determined by people having ordinary skill in the art, considering the measurement in question and the error associated with the measurement of the particular quantity (i.e., the limitations of the measurement system). For example, "about" may mean within one or more standard deviations, for example, within ±30%, ±20%, ±15%, ±10%, ±5% of the stated value. Furthermore, a relatively acceptable range of deviation or standard deviation may be chosen for the terms "about," "approximately," "essentially," or "substantially" as used herein based on measuring properties, cutting properties or other properties, instead of applying one standard deviation across all the properties.

In the drawings, the thicknesses of layers, films, panels, regions, etc., are exaggerated for clarity. It should be understood that when an element such as a layer, film, region, or substrate is referred to as being "on" or "connected to" another element, it may be directly on or connected to another element, or intervening elements may also be present. In contrast, when an element is referred to as being "directly on" or "directly connected to" another element, no intervening elements are present. As used herein, "connected" may refer to physical connection and/or electrical connection. Furthermore, "electrical connection" may mean the presence of other elements between two elements.

Reference will now be made in detail to the present preferred embodiments of the disclosure, examples of which are illustrated in the accompanying drawings. Whenever possible, the same reference numbers are used in the drawings and description to refer to the same or like parts.

FIG. 1 is a schematic top view of a display device according to a first embodiment of the disclosure. Referring to FIG. 1, a display device 10 includes a display unit 100. For example, two display units 100 are schematically drawn in FIG. 1, which means that the display device 10 is, for example, a spliced display. However, the disclosure does not limit the number of display units 100. In other embodiments, the number of display units 100 may be one or more to serve as a non-spliced display or a larger-area spliced display.

In FIG. 1, each display unit 100 may include a substrate 110, and a liquid crystal display area 120A and a peripheral display area 120B surrounding the liquid crystal display area 120A may be defined on the substrate 110. For example, the liquid crystal display area 120A is a non-self-luminous display area, and the liquid crystal display area 120A includes a plurality of first sub-pixels P1 for providing display light. The first sub-pixel P1 includes, for example, a red sub-pixel R1, a green sub-pixel G1, and a blue sub-pixel B1. In other words, the plurality of first sub-pixels P1 may be defined as color pixels of the liquid crystal display. In some embodiments, although not shown in the figure, the substrate 110 in the display unit 100 may include a backlight module, a lower polarizer, a working panel, and an upper polarizer. The working panel may include, for example, an array substrate (such as a TFT substrate), a liquid crystal layer, and a color filter (CF) substrate. Alternatively, the working panel may include, for example, a color filter on array (COA) substrate and a liquid crystal layer, but it is not limited thereto. The substrate 110 may add or remove one or more elements according to requirements. On the other hand, the disclosure does not limit the liquid crystal display type of the liquid crystal display area 120A. For example, it may be twisted nematic (TN) type liquid crystal display technology, vertical alignment (VA) type liquid crystal display technology, in-plane switching (IPS) type liquid crystal display technology, or fringe field switching (FFS) type liquid crystal display technology.

In the embodiment, the peripheral display area 120B of the substrate 110 may be regarded as a border area of the display, and the peripheral display area 120B may include a plurality of second sub-pixels P2 for providing display light. The second sub-pixel P2 includes, for example, a red sub-pixel R2, a green sub-pixel G2, and a blue sub-pixel B2. On the other hand, the peripheral display area 120B may include a variety of signal lines (such as data lines, scanning lines, or power lines, not shown) and at least one driving circuit chip (not shown). The driving circuit chip, for example, has transistors or integrated circuits (ICs) that may be electrically connected to the second sub-pixel P2 and control the display signal of the second sub-pixel P2 to provide a display image, and the disclosure is not limited thereto. In other embodiments, the substrate 110 may also include a combination of a glass substrate and a pixel circuit layer. The pixel circuit layer is formed on the glass substrate using a semiconductor process, and the pixel circuit layer may include active components (such as thin film transistors) and various signal lines (such as data lines, scanning lines, or power lines), but the disclosure is not limited thereto.

Figure 2:
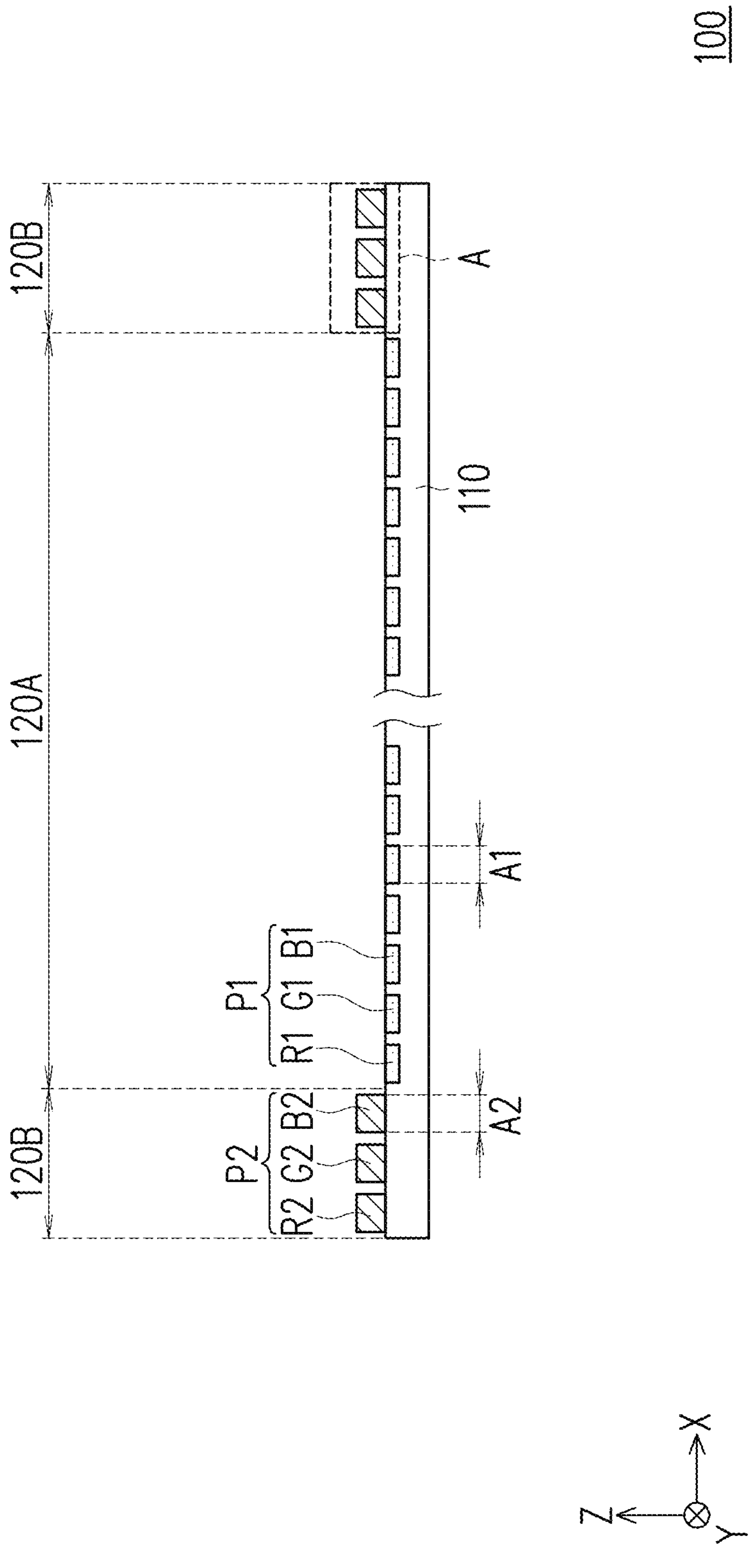
FIG. 2 is a schematic cross-sectional view of the display device depicted in FIG. 1.
Figure 3:
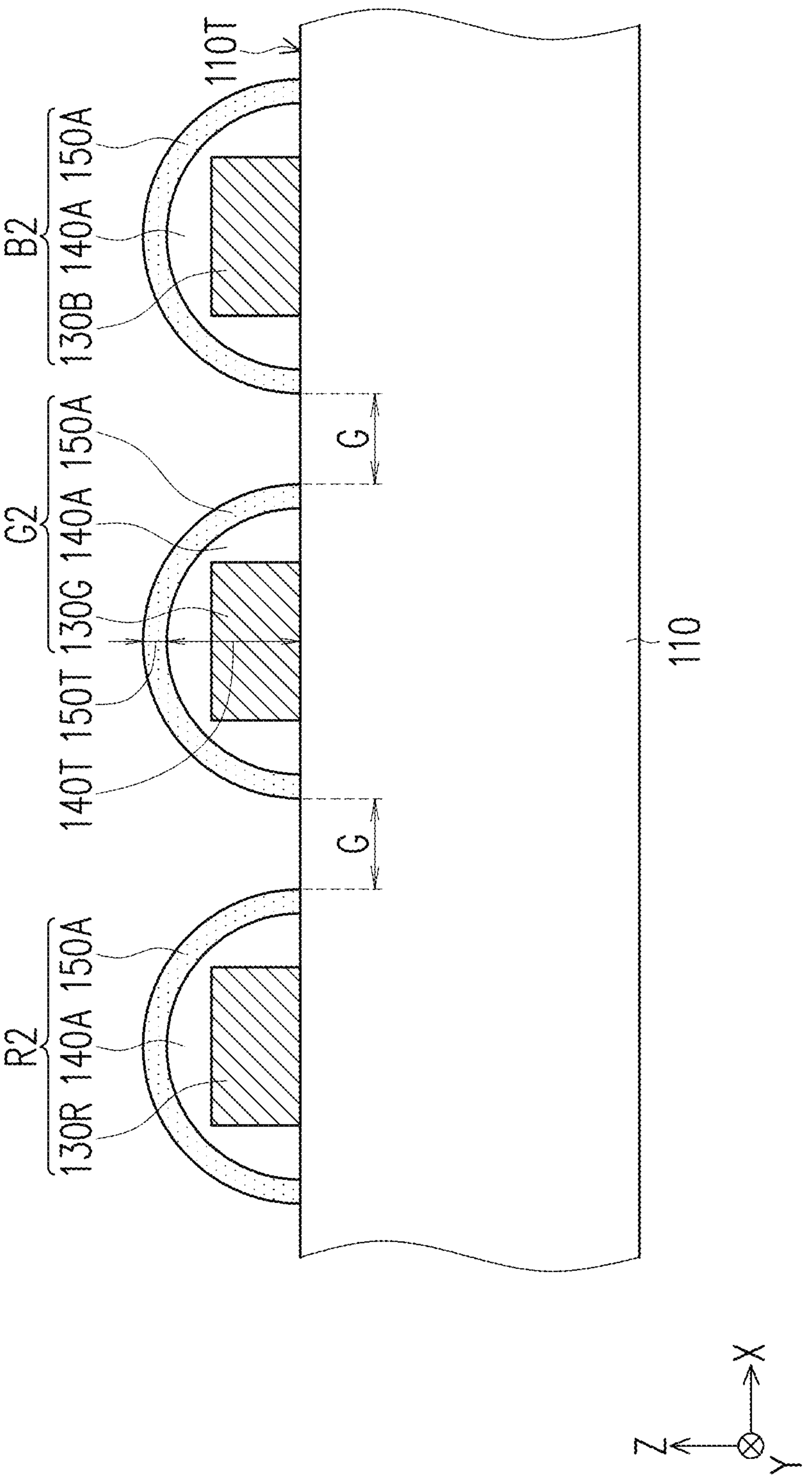
FIG. 3 is an enlarged schematic view of the area A depicted in FIG. 2.

FIG. 2 is a schematic cross-sectional view of the display device depicted in FIG. 1. FIG. 3 is an enlarged schematic view of the area A depicted in FIG. 2. Referring to FIG. 2 and FIG. 3 at the same time, on the other hand, in the disclosure, the second sub-pixel P2 is a pixel using self-luminous display technology. For example, each of the plurality of second sub-pixels P2 may include a light-emitting element 130, an encapsulation layer 140A, and a diffusion layer 150A sequentially stacked in a direction Z. The light-emitting element 130 is used to provide a display light beam of the second sub-pixel P2. The encapsulation layer 140A surrounds and contacts the light-emitting element 130. For example, in FIG. 3, a plurality of encapsulation layers 140A respectively surround and contact a light-emitting element 130R, a light-emitting element 130G, and a light-emitting element 130B, and a plurality of diffusion layers 150A respectively surround and contact the plurality of encapsulation layers 140A.

In detail, the light-emitting element 130 may include the light-emitting element 130R that emits a red light beam, the light-emitting element 130G that emits a green light beam, and the light-emitting element 130B that emits a blue light beam. The light-emitting element 130R, the light-emitting element 130G, and the light-emitting element 130B are all disposed on the peripheral display area 120B of the substrate 110. The above-mentioned light-emitting elements 130R, 130G, and 130B may be a red light-emitting diode, a green light-emitting diode, or a blue light-emitting diode. The light-emitting element 130 is, for example, a micro light-emitting diode (micro LED), a mini light-emitting diode (mini LED), or other sizes of light-emitting diodes, and the disclosure is not limited thereto. Preferably, the light-emitting element 130 may be a micro light-emitting diode. On the other hand, the light-emitting element 130 may be a vertical type light-emitting diode or a flip-chip type light-emitting diode. For example, electrodes located on the same side of the epitaxial structure of these light-emitting elements 130 and bonding pads (not shown) corresponding to an upper surface 110T of the substrate 110 may be aligned with each other, and may be bonded to each other using surface-mount technology (SMT) or mass transfer technology, so as to achieve electrical connection between the plurality of light-emitting elements 130 and the substrate 110. However, the disclosure is not limited thereto.

The plurality of encapsulation layers 140A may be used to fix, isolate and protect the light-emitting element 130R, the light-emitting element 130G, and the light-emitting element 130B, so as to prevent each light-emitting element 130 from being oxidized or corroded by moisture and oxygen, and the encapsulation layers 140A may provide appropriate buffering when the display device 10 is subjected to external force. Therefore, the encapsulation layer 140A is preferably selected from a material with stable and insulating properties. On the other hand, the optical properties of the encapsulation layer 140A are preferably materials with high transmittance to prevent the encapsulation layer 140A from affecting the light-emitting efficiency of the light-emitting element 130. The encapsulation layer 140A may be made of optical clear adhesive (OCA), optical clear resin (OCR), other suitable optical grade adhesive materials, or glass material to further enhance the protection effect of the display device 10. The encapsulation layer 140A may have an appropriate refractive index, which is beneficial to improving the light extraction effect of the light-emitting element 130. In some embodiments, the refractive index of the encapsulation layer 140A may be substantially 1.5. However, the disclosure is not limited thereto.

The diffusion layer 150A may be formed of organic polymer through mechanical processing, sand blasting, silver particle coating, etc. Alternatively, the surface may be roughened through a photolithography and etching process, ultraviolet light, or plasma to form uneven and randomly distributed microstructures on the surface of the diffusion layer 150A facing away from the substrate 110. Therefore, the diffusion layer 150A may be made of the same material as the encapsulation layer 140A, but the disclosure is not limited thereto. In some embodiments, the diffusion layer 150A may also be made of a different transparent material from the encapsulation layer 140A, and scattering particles (such as acrylic resin paint, inorganic particles, or synthetic polymer particles) are added to the transparent material, and baked at high temperature to remove the solvent and harden to obtain the diffusion layer 150A. Therefore, the diffusion layer 150A may have a specific haze value. For example, the haze value of the diffusion layer 150A may be greater than or equal to 30%, but the disclosure is not limited thereto.

Referring to FIG. 1 to FIG. 3 at the same time, it is worth mentioning that a projected area A2 of the diffusion layer 150A on the substrate 110 may be substantially equal to a projected area A1 of the first sub-pixel P1 on the substrate 110. From another perspective, the area A2 may be substantially equal to the projected area of the second sub-pixel P2 on the substrate 110. Through the above configuration, the light beams emitted by each light-emitting element 130 may be diffused and uniformed after sequentially passing through the encapsulation layer 140A and the diffusion layer 150A. Therefore, the light field or light pattern of the second sub-pixel P2 may be approximately or equal to the light field or light pattern of the first sub-pixel P1. Therefore, the display images displayed by the first sub-pixel P1 and the second sub-pixel P2 may be substantially the same. When the user views the display images provided by the liquid crystal display area 120A and the peripheral display area 120B, it is difficult to detect the difference between the display images provided by the two. Therefore, the display device 10 may theoretically achieve full-screen display. When applied to the spliced display, it may also effectively eliminate the common problem of discontinuity in the splicing seams and effectively improve the quality of the display image of the spliced display.

From another perspective, the light-emitting element 130 may be a micro light-emitting diode, and the size of the micro light-emitting diode is often smaller than the size of the liquid crystal pixel. The difference between the pixel size of the liquid crystal display and the pixel size of the micro light-emitting diode is too large, and it is easy for users to notice the difference between the two, causing viewing discomfort. Through the arrangement of the encapsulation layer 140A and the diffusion layer 150A, it is also easy to make the size of the second sub-pixel P2 and the first sub-pixel P1 consistent. In addition, the lateral light emission of the micro light-emitting diode (for example, the light is emitted in the direction of the plane where a direction X and a direction Y depicted in FIG. 3 are located) accounts for a high proportion of the overall light emission, such that the forward light emission (for example, the light beam emitted toward the direction Z depicted in FIG. 3) is relatively insufficient. However, diffusing the light beam of the micro light-emitting diode through the diffusion layer 150A may also effectively improve the light field distribution of the micro light-emitting diode, such that the light field pattern of the second sub-pixel P2 is closer to the light field pattern of the first sub-pixel PI in the liquid crystal display area 120A in terms of viewing angle, effectively improving the user's discomfort when viewing the display device 10. It should be noted that the direction X, the direction Y, and the direction Z may be substantially perpendicular to each other, but the disclosure is not limited thereto.

In some embodiments, the shape of the second sub-pixel P2 may be substantially equal to the shape of the first sub-pixel P1. Taking FIG. 1 as an example, the projection shapes of the second sub-pixel P2 and the first sub-pixel P1 on the substrate 110 may both be rectangular. The second sub-pixel P2 has a long side L and a short side W. The ratio of the long side L and the short side W may be greater than or equal to 3 and less than or equal to 5.

On the other hand, the encapsulation layer 140A and the diffusion layer 150A may have a certain thickness to provide corresponding protection functions and light uniformity functions. For example, in some embodiments, a thickness 140T of the encapsulation layer 140A may be greater than or equal to 5 microns and less than or equal to 10 microns; in some embodiments, a thickness 150T of the diffusion layer 150A may be greater than 5 microns. The definition of the thickness 140T here may refer to the maximum vertical height of the encapsulation layer 140A on the upper surface 110T of the substrate 110. The definition of the thickness 150T may refer to the vertical distance of the diffusion layer 150A in the direction Z.

Continuing to refer to FIG. 3, it should be noted that in order to improve the optical display effect of the second sub-pixel P2, the plurality of second sub-pixels P2 may be separated from each other by a gap G. For example, the respective encapsulation layers 150A of the red sub-pixel R2, the green sub-pixel G2, and the blue sub-pixel B2 may be disconnected or separated from each other to form the gap G. When each second sub-pixel P2 emits display light beams of different colors, the encapsulation layers 150A that are separated from each other and disposed independently may reduce the probability of color mixing or crosstalk of different colors of light, so as to improve the contrast and color gamut of the display image, which is conducive to improving the display quality of the display image. Although not shown in FIG. 3, a light-absorbing layer, a separation layer, or other suitable black matrix (BM) elements may be further disposed in the gap G to absorb the lateral light emission of the light-emitting elements 130 of the plurality of second sub-pixels P2, so as to further enhance the contrast of the display image of the plurality of second sub-pixels P2. Since the brightness of micro light-emitting diodes is usually greater than the brightness of liquid crystal pixels, the arrangement of the light-absorbing layer is also conducive to making the display brightness of the second sub-pixel P2 and the display brightness of the first sub-pixel P1 tend to be consistent, which may further enhance the user's viewing experience.

Referring to FIG. 1 and FIG. 3 at the same time. in the embodiment, the plurality of second sub-pixels P2 are arranged in three rows in the direction Y of the peripheral display area 120B and in one row in the direction X. However, the disclosure is not limited thereto. In other embodiments, the plurality of second sub-pixels P2 may have different row numbers in the direction Y and the direction X. On the other hand, in the embodiment, the shape of the plurality of second sub-pixels P2 may be a semi-cylinder. For example, in the cross-sectional view of FIG. 3, the red sub-pixel R2, the green sub-pixel G2, and the blue sub-pixel B2 of the second sub-pixel P2 may all be disposed on the upper surface 110T of the substrate 110 in the form of a semi-cylinder, and further directly contact the upper surface 110T. The diffusion layer 150A on the second sub-pixel P2 may have an appropriate radius of curvature, for example, 100 microns, but the disclosure is not limited thereto. The upper surface 110T may be, for example, the outermost surface (i.e., the outer surface) of the display unit 100 in the display direction (e.g., direction Z). The light-emitting element 130 is directly disposed on the outer surface of the substrate 110 to facilitate the formation of the structure of the second sub-pixel P2, reducing the process difficulty and further optimizing the product yield.

Figure 4:
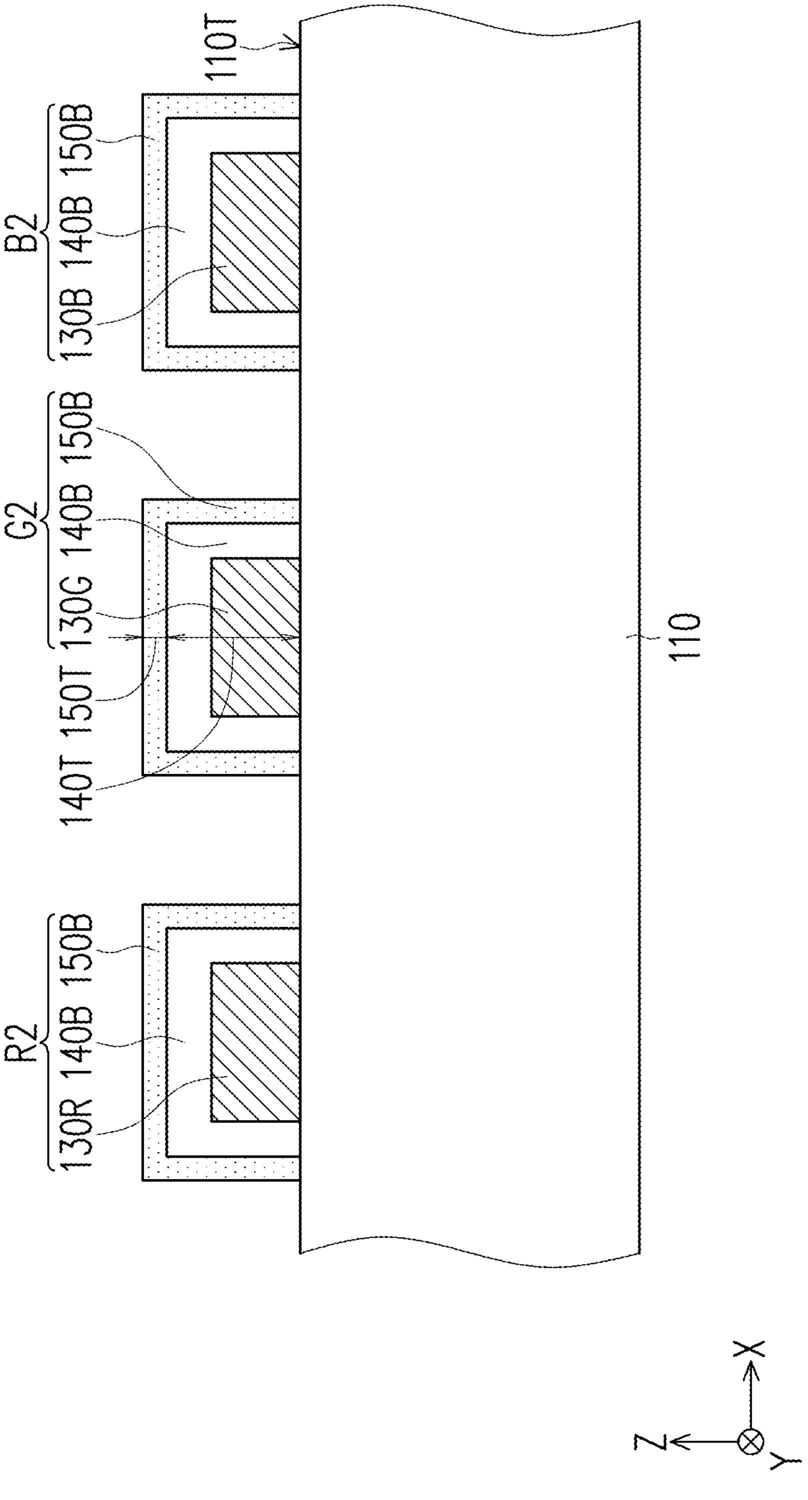
FIG. 4 is an enlarged schematic view of another modified embodiment of the second sub-pixel depicted in FIG. 3.

FIG. 4 is an enlarged schematic view of another modified embodiment of the second sub-pixel in FIG. 3. The same components are denoted by the same referential numerals, and descriptions of the same technical contents are omitted. Reference may be made to the foregoing embodiments for the omitted parts, and is not repeated herein. Referring to FIG. 4, the second sub-pixel P2 may also have other shapes or structures. For example, the shape of the second sub-pixel P2 depicted in FIG. 4 may be substantially a rectangular parallelepiped. An encapsulation layer 140B and a diffusion layer 150B may also have corresponding rectangular parallelepiped shapes or profiles. Accordingly, the rectangular parallelepiped shaped second sub-pixel P2 may also have similar optical effects to the semi-cylindrical-shaped second sub-pixel P2, and is not repeated herein.

Figures 5A, 5B, 5C, 5D, 5E:
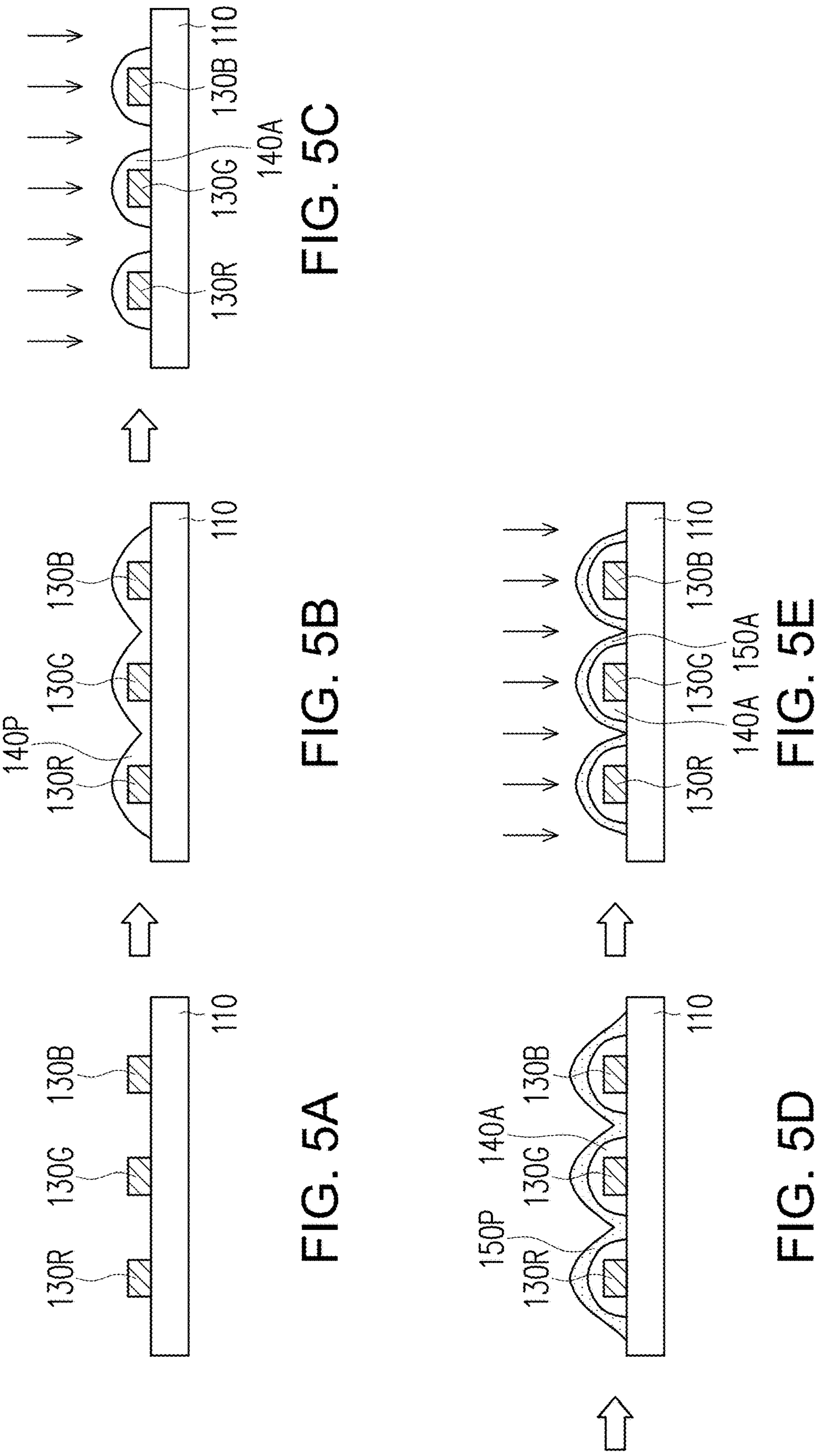
FIG. 5A to FIG. 5E are schematic views of a manufacturing process of a display device according to an embodiment of the disclosure.

FIG. 5A to FIG. 5E are schematic views of a manufacturing process of a display device according to an embodiment of the disclosure. The figure schematically illustrates the manufacturing method of the second sub-pixel P2 depicted in the embodiment of FIG. 3, but the disclosure is not limited thereto. The manufacturing process of FIG. 5A to FIG. 5E may also be applied to manufacturing the second sub-pixel P2 depicted in FIG. 4. Referring to FIG. 5A first, after the substrate 110 with the liquid crystal display function is completed, the plurality of light-emitting elements 130R, 130G, and 130B may be disposed in the peripheral display area 120B of the substrate 110. For the arrangement method of the light-emitting element 130R, the light-emitting element 130G, and the light-emitting element 130B, reference may be made to the above-mentioned relevant paragraphs and is not repeated herein.

Referring next to FIG. 5B, an encapsulation material 140P is then disposed on the plurality of light-emitting elements 130R, 130G, and 130B, so that the encapsulation material 140P contacts and surrounds the plurality of light-emitting elements 130R, 130G, and 130B. The method of disposing the encapsulation material 140P is, for example, spin coating, physical vapor deposition, or chemical vapor deposition, and the disclosure is not limited thereto.

Referring next to FIG. 5C, after the above steps are completed, the encapsulation material 140P may be subjected to a photolithography process and an etching process, and the encapsulation material 140P is patterned to form the encapsulation layers 140A separated from each other. The etching process may be, for example, a wet etching process or a dry etching process, but the disclosure is not limited thereto.

Next, referring to FIG. 5D and FIG. 5E, after the above steps are completed, a diffusion material 150P may be disposed on the encapsulation layers 140A, and then the diffusion material 150P may be patterned sequentially to form the diffusion layers 150A separated from each other. For the coating or arrangement method of the diffusion material 150P, reference may be made to the coating or arrangement method of the encapsulation material 140P. For the patterning process of the diffusion layer 150A, reference may also be made to the patterning process of the encapsulation layer 140A, and is not repeated herein. Accordingly, the arrangement of the second sub-pixel P2 in the display device 10 is initially completed.

Figure 6A:
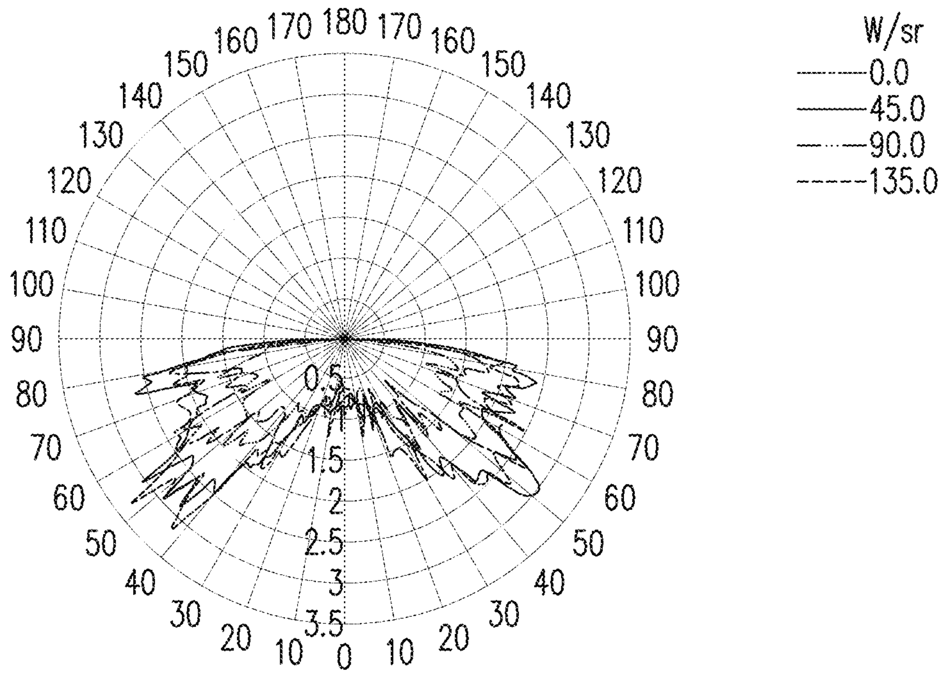
FIG. 6A to FIG. 6C are light field comparison diagrams of display devices according to an embodiment of the disclosure.
Figure 6B:
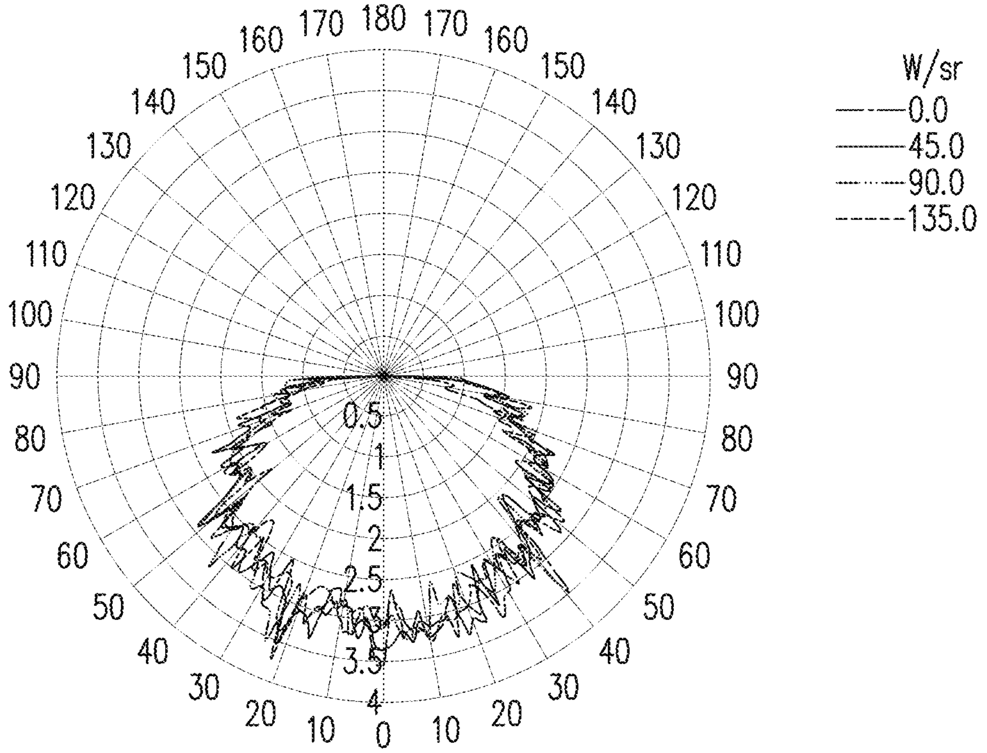
Figure 6C:
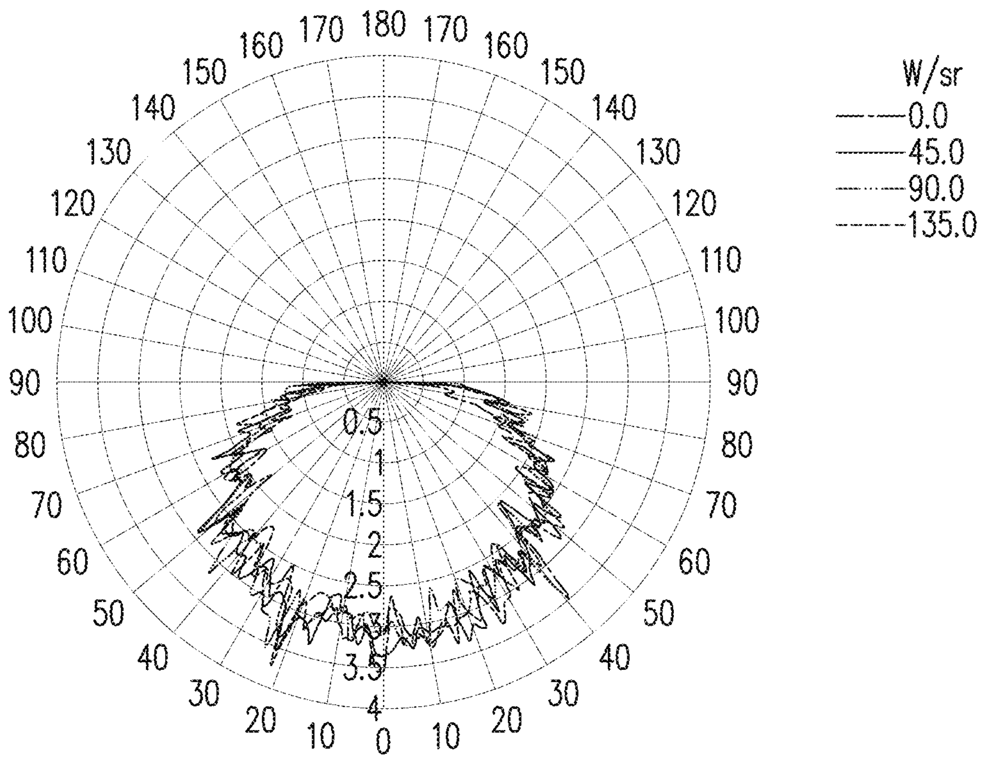

FIG. 6A to FIG. 6C are light field comparison diagrams of display devices according to an embodiment of the disclosure. The light field distribution of conventional micro light-emitting diodes at different radiation intensities is plotted in FIG. 6A; the light field distribution of the second sub-pixel P2 in the embodiment of the disclosure depicted in FIG. 4 at different radiation intensities is plotted in FIG. 6B; the light field distribution of the second sub-pixel P2 of the embodiment of the disclosure depicted in FIG. 3 at different radiation intensities is plotted in FIG. 6C. Referring to FIG. 6A to FIG. 6C at the same time, it can be seen that through the arrangement of the encapsulation layers 140A and 140B or the diffusion layers 150A and 150B of the disclosure, the light field distribution of the lateral light emission of the micro light-emitting diodes becomes a Lambertian distribution that is close to complete diffuse reflection, and is also similar to the light field distribution of the first sub-pixel P1 in the liquid crystal display area 120A. Accordingly, the second sub-pixel P2 may achieve a viewing effect similar to the viewing effect of the first sub-pixel P1, which is beneficial to the user's viewing experience.

In summary, in the display device of the disclosure, the light-emitting element is disposed in the peripheral display area to provide display functions, so that both the liquid crystal display area and the peripheral display area may provide display images, and the entire display surface of the display may be theoretically borderless, so as to provide a good viewing experience when used as a spliced display device. Not only that, since the projected area of the diffusion layer on the light-emitting element in the border area is substantially equal to the projected area of the sub-pixel in the liquid crystal display area, the light field of the pixels in the peripheral display area and the light field of the pixels in the liquid crystal display area may be made nearly consistent. It makes it difficult for users to detect the difference between the two, and theoretically achieves the effect of a full-screen display device, greatly improving the quality of the display image.

Although the disclosure has been described with reference to the embodiments above, the embodiments are not intended to limit the disclosure. Any person skilled in the art can some changes and modifications without departing from the spirit and scope of the disclosure. Therefore, the scope of the disclosure will be defined in the appended claims.

What is claimed is:

1. A display device comprising a display unit, the display unit comprising:
 a substrate, having a liquid crystal display area and a peripheral display area surrounding the liquid crystal display area, wherein the liquid crystal display area comprises a plurality of first sub-pixels, the peripheral display area comprises a plurality of second sub-pixels, and each of the second sub-pixels comprises:
  a light-emitting element;
  an encapsulation layer, surrounding and contacting the light-emitting element;
  a diffusion layer, surrounding and contacting the encapsulation layer, wherein the light-emitting element, the encapsulation layer, and the diffusion layer are sequentially stacked on the substrate, and a projected area of the diffusion layer on the substrate is substantially equal to a projected area of the first sub-pixel on the substrate.

2. The display device according to claim 1, wherein a thickness of the encapsulation layer is greater than or equal to 5 microns and less than or equal to 10 microns.

3. The display device according to claim 1, wherein a thickness of the diffusion layer is greater than 5 microns.

4. The display device according to claim 1, wherein the diffusion layer of each of the second sub-pixels is separated from each other.

5. The display device according to claim 1, wherein a haze of the diffusion layer is greater than or equal to 30%.

6. The display device according to claim 1, wherein a shape of the diffusion layer is substantially a semi-cylinder.

7. The display device according to claim 1, wherein a shape of the diffusion layer is substantially a rectangular parallelepiped.

8. The display device according to claim 1, wherein a projection of one of the second sub-pixels on the substrate has a long side and a short side, and a ratio of the long side to the short side is greater than or equal to 3 and less than or equal to 5.

9. The display device according to claim 1, wherein the second sub-pixels are arranged in a plurality of rows on the peripheral display area.

10. The display device according to claim 1, wherein the light-emitting element is a micro light-emitting diode, and the light-emitting element is disposed on an outer surface of the substrate.

* * * * *